May 23, 1944.      R. ANDERS      2,349,330
THREAD TAP GAUGE
Filed March 22, 1943
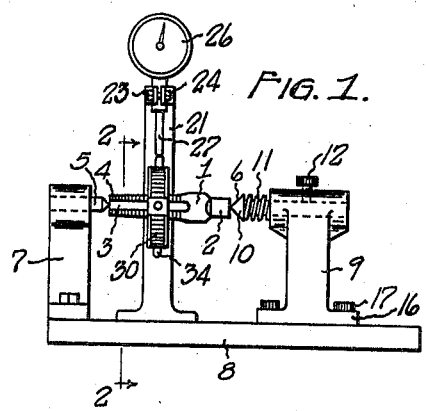
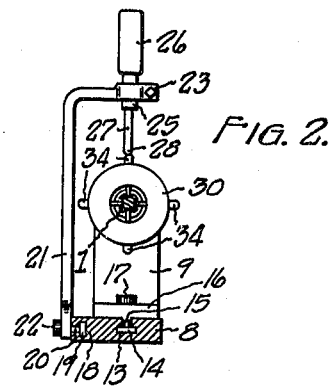
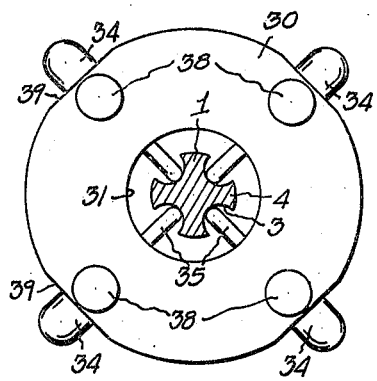
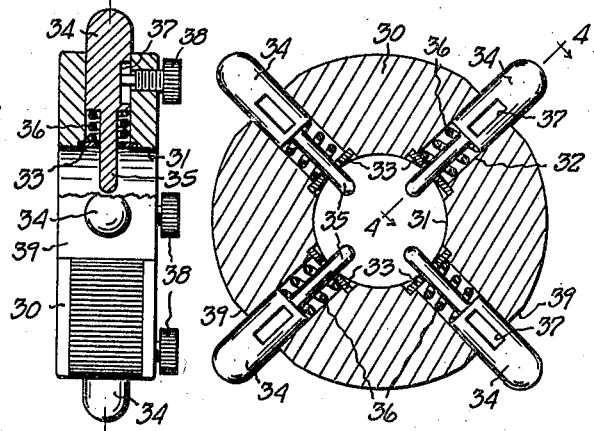
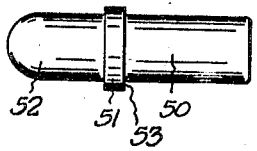
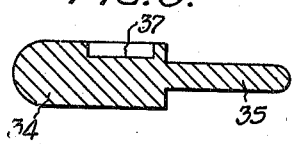
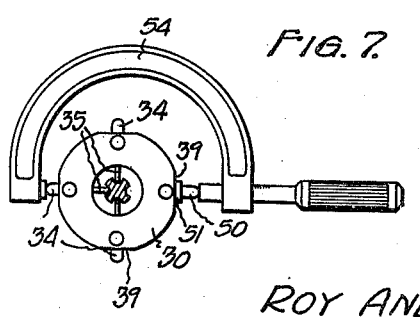
ROY ANDERS.
INVENTOR.
BY Oltsch & Knoblock
Attorneys.

Patented May 23, 1944

2,349,330

UNITED STATES PATENT OFFICE 2,349,330

THREAD TAP GAUGE

Roy Anders, Center Township, Marshall County, Ind., assignor of one-half to John W. Pletcher, Jr., South Bend, Ind.

Application March 22, 1943, Serial No. 480,022

7 Claims. (Cl. 33—201)

This invention relates to improvements in thread tap gauges. More particularly the invention relates to gauges by means of which thread taps may be accurately checked to determine the balance of the flutes thereof.

When a thread tap becomes dulled or chipped, it can often be reconditioned for further use by grinding thereof at its grooves to sharpen the entering or leading edges of its thread cutting flutes. However, to be effective, the grinding must be accurate, so that the flutes are of substantially equal width to insure a dynamically balanced condition of the tap. Thus, if the grinding is not accurate so that the tap flutes are of unequal widths and the tap is not dynamically balanced, the tap will not cut properly. Use of an improperly reconditioned tool may result in spoilage of work upon which many prior operations have been performed with substantial resultant loss. The present practice of testing or inspecting a reconditioned tap is simply to inspect or measure it by eye to determine the sharpness of the edge, the pitch or angle of the groove wall at the cutting edge, and the relation of the flutes. Such visual inspection, even by a trained or experienced inspector, is not sufficiently accurate to predetermine the usability of a tap and to avoid spoilage of work.

Therefore, it is the primary object of this invention to provide a device by which an accurate determination of the usability and dynamic balance of a thread tap may be made easily and quickly.

A further object is to provide a device of this character by means of which the relation of each of the grooves of a thread tap to the other may be accurately measured.

A further object is to provide a device of this character including an apertured gauge block adapted to fit around a tap and adjustably mounting a plurality of equi-angularly arranged, radially slidable measuring pins engageable in the tap grooves, and means for measuring the relation of each pin to said block.

A further object is to provide a device of this character having means for mounting a tap for rotation about its axis, a gauge block encircling the tap and having radially adjustable tap-engaging portions, and means for mounting a measuring device to successively measure the positions of said tap-engaging gauge portions.

Other objects will be apparent from the description, drawing and appended claims.

In the drawing:

Fig. 1 is a view of the device in side elevation.

Fig. 2 is a vertical transverse sectional view taken on line 2—2 of Fig. 1.

Fig. 3 is an enlarged view of the gauge block in side elevation.

Fig. 4 is an edge view of the gauge block with part shown in section on line 4—4 of Fig. 3.

Fig. 5 is a sectional view of the block taken on line 5—5 of Fig. 4.

Fig. 6 is an enlarged view of a measuring pin, in longitudinal section.

Fig. 7 is a view illustrating a different manner of using the gauge block.

Fig. 8 is an enlarged view illustrating, in side elevation, another measuring pin usable with the gauge block.

Referring to the drawing, and particularly to Figs. 1 to 6, inclusive, the numeral 1 designates a thread tap having an end portion 2 adapted to be mounted in a tool holder. A plurality of equi-spaced longitudinal grooves 3 are found in the body of the tap and define similar equi-spaced, longitudinal flutes 4 whose outer surfaces are threaded. The rotatively leading longitudinal edge of each threaded flute constitutes a cutting edge. At each end the tap is provided with centering recesses (not shown).

The tap is mounted between centers 5 and 6 fitting in the centering recess. Center 5 is fixedly mounted in an upright 7 fixedly mounted on one end of a base 8. Center 6 is mounted for longitudinal sliding movement in an upright 9, and has a head 10 of larger diameter than its shank. A coil spring 11 is interposed between head 10 and upright 9 to normally urge center 6 inwardly. Upright 9 is provided with a set screw or thumb screw 12 adapted to press upon the shank of the center 6 to lock it in adjusted position. Base 8 has a longitudinal dovetailed groove 13 adapted to slidably receive the heads 14 of bolts 15 projecting through the enlarged base plate 16 of upright 9. Thumb nuts 17 threaded on bolts 15 serve to clamp the base plate 16 of upright 9 in adjusted position longitudinally of base 8.

Base 8 is provided with a longitudinal dovetailed groove 18 in its rear face to receive heads 19 of bolts 20 which pass through the enlarged lower end portion of standard 21. Thumb nuts 22 threaded on bolts 20 serve to clamp standard 21 in selected position longitudinally of base 8. At its upper end the standard 21 is provided with a clamp 23 provided with a tightening thumb screw 24 and adapted to clamp the sleeve 25 of a conventional micrometric indicator 26 having an axially shiftable stem 27 within sleeve 25 and terminating in a rounded touching head 28 at its outer end.

A gauge block 30 having a central bore 31 extending therethrough, and preferably of annular form, is adapted to encircle tap 1. Block 30 has a plurality of equi-angularly disposed radial bores formed therein and opening at bore 31. The axes of the radial bores 32 lie in a common plane and the bores are accurately machined and finished. At the inner mouth of each radial bore 32 is fixedly mounted a collar 33 concentric therewith. In each bore 32 is longitudinally slidably mounted a measuring pin 34 of a length greater than the length of said bore. The inner end portion 35 of each pin is of reduced diameter and is concentric with the remainder of the pin. A coil spring 36 encircles each pin portion 35, with its inner end bearing against collar 33 and its outer end bearing against the shoulder formed at the juncture of the large and small diameter pin portions. The end of reduced diameter pin portion 35 is preferably semi-spherical. The large diameter portion of the measuring pin has a longitudinal slot 37 formed therein, and receives the end of a thumb screw 38 threaded in the gauge block. Each pin also has a rounded outer end, and the pins are of exactly equal length.

The device is used as follows: Tap 1 is inserted through bore 31 of gauge block 30 to a predetermined position, with pins 34 aligned with tap grooves 3. Measuring pins 34 are then urged inwardly into engagement with tap grooves 3 and are clamped in that tap-engaging position by thumb screws 38. The tap is then mounted between centers 5 and 6 and shiftable center 6 is clamped in tap engaging and supporting position by thumb screw 12. The gauge block is positioned for substantial alignment of measuring pins 34 with the stem 27 of indicator 26, and for this purpose the above described sequence of operations may be reversed to the extent that tap 1 is mounted between centers 5 and 6 before the position of gauge block 30 on tap 1 is fixed by clamping of the measuring pins 34.

The device is now conditioned for measurement, which is effected by rotating the tap 1 to bring the outer ends of measuring pins 34 successively into engagement with the touching head 28 of indicator 26. Inasmuch as the tap rotates about its axis, as determined by the preformed centering recesses in its ends, and pins 34 are of exactly equal lengths, any difference in the measurements as different pins are brought into aligned engagement with the indicator stem is the result of a difference existing in the tap at its grooves. In this connection tap grooves 3 are of substantially rounded transverse shape, and the equi-angularly arranged pins touch the equi-angularly arranged tap grooves at the same transverse point of each. Consequently, a difference in measurement, while primarily or directly a difference of radial dimension, is necessarily a measurement of difference of the widths of the tap grooves and of the flutes 4. The determination of the existence and the amount of differences measured at the tap grooves, if exceeding permissible tolerances, provides an accurate basis for rejection of a tap by an inspector, or provides a guide for reworking or regrinding of the tap to the extent required to properly condition it for service. After the measurements have been completed, the tap can be removed from the device quickly by simply releasing the thumb screw 12 to permit center 6 to be shifted, and by releasing thumb screws 38 to permit release of the gauge block from the tap.

In some cases it may be found that the centering recess at one end of a reconditioned tap to be measured has been damaged to an extent preventing accurate centered mounting of the tap between centers 5 and 6. In such cases the tap, when of the type having an even number of grooves 3, may be measured in the manner illustrated in Fig. 7. The gauge block 30 is provided with a flat surface 39 surrounding the outer end of each radial bore 32. Surfaces 39 are accurately machined to be exactly perpendicular to the axis of the adjacent bore 32 and to be spaced exactly the same distance from the axis of central bore 31. A supplemental measuring pin 50, as illustrated in Fig. 8, is used with the gauge block 30. Pin 50 has an enlarged diameter intermediate portion 51 and a rounded outer end portion 52. The end face 53 of enlarged portion 51 is accurately machined to fit flush with gauge surface 39 when the inner end portion thereof fits within a bore 32. Pin 50 is inserted in one of the bores 32, and pins 34 are clamped in the remaining bores. An outside micrometer 54 is then employed to measure accurately the spacing between the tip of pin 50 and the tip of the aligned measuring pin 34. Pin 50 is then removed and inserted in another bore 32, being replaced by a pin 34, and another measurement is taken. This is continued until the pin 50 has been placed in each bore 32 and measurements have been taken at each position. Any difference measured will constitute a detection of unbalance of the tap grooves and flutes and a guide for corrective grinding. Note that care must be taken in the Fig. 7 arrangement to insure exact centering of the tap in the gauge block 30 before each measurement is made. However, this does not present a serious problem with a tap having four or more grooves because equal inward pressure on three pins 34 will tend to cause each pin to seat against the same transverse point of each tap groove, and thus substantially automatically effect concentric arrangement of tap and gauge block. It will also be understood that the use of pin 50 is preferred because of the degree of accuracy of measurement permitted, but it may be omitted and measurements may be made by the micrometer 54 between the tip of a pin 34 and the diametrically opposed surface 39 of the gauge block.

I claim:

1. A thread tap gauge comprising an apertured block having a plurality of equi-spaced radial bores, a plurality of pins of equal length each axially slidable in a radial bore, and means for locking said pins in fixed position in said block.

2. A thread tap gauge comprising an apertured block having a plurality of equi-angularly disposed radial bores whose axes lie in a common plane, a plurality of pins of equal length and longer than said bores, said pins being axially slidable in said radial bores and having reduced diameter inner touching portions, and means for clamping said pins in fixed position in said bores.

3. A thread tap gauge comprising an apertured block having a plurality of equi-spaced bores extending radially relative to said first bore, a plurality of pins of equal length axially slidable in said radial bores, and means for clamping said pins in fixed position in said bores, said block having a plurality of plane faces intersected by and perpendicular to the axes of said radial bores and equi-spaced from the axis of said first bore.

4. A thread tap gauge comprising an apertured block having a plurality of coplanar equi-spaced bores extending radially from said first bore, a plurality of pins of equal length slidable axially in said radial bores and normally outwardly spring pressed, and means for clamping said pins in said radial bores, said pins projecting into said first bore and outwardly from said block.

5. A thread tap gauge comprising a flat block having a central transverse bore and a plurality of equi-spaced bores extending radially from and communicating with said first bore, spring pressed pins axially slidable in said radial bores, said pins each being of equal length greater than the length of said radial bores and having rounded ends, and means for clamping said pins in fixed position in said bores.

6. A thread tap gauge comprising a centrally apertured block having a plurality of equi-spaced bores extending radially of and communicating with said central aperture, each bore having a reduced diameter inner end portion, a plurality of pins of equal length and longer than said bores each mounted in a bore, said pins having elongated reduced diameter inner end portions, a coil spring encircling each reduced diameter pin portion and bearing against said reduced diameter bore portion at its inner end, and means for clamping said pins in said bores.

7. A thread tap gauge comprising a centrally apertured block having a plurality of equi-spaced bores extending radially of and communicating with said central aperture, a plurality of collars fixedly carried by said block at the inner ends of said bores and having reduced diameter bores concentric with said first bores, a plurality of pins of equal length fitting snugly and slidably in said first bores and each having an elongated reduced diameter concentric inner portion defining a shoulder intermediate the length thereof, a coil spring encircling each reduced diameter pin portion with its ends bearing against said collar and shoulder, and a plurality of set screws carried by said block and engageable with said pins.

ROY ANDERS.